United States Patent [19]

Randolph

[11] 3,995,359

[45] Dec. 7, 1976

[54] QUILTING MACHINE

[76] Inventor: Arthur J. Randolph, P.O. Box 1541, Santa Rosa, Calif. 95405

[22] Filed: Sept. 24, 1975

[21] Appl. No.: 616,199

[52] U.S. Cl. ............................ 29/211 R; 29/208 R

[51] Int. Cl.$^2$ ............................................ B23Q 7/10

[58] Field of Search ......... 29/208 R, 211 R, 200 R; 227/116, 60, 58, 59

[56] References Cited

UNITED STATES PATENTS

| | | | |
|---|---|---|---|
| 3,012,258 | 12/1961 | Schott et al. | 29/211 R X |
| 3,199,184 | 8/1965 | Harris et al. | 29/208 R X |
| 3,456,483 | 7/1969 | Crothers et al. | 29/211 R X |
| 3,564,693 | 2/1971 | Avernhammer | 29/211 R X |

*Primary Examiner*—Victor A. DiPalma
*Attorney, Agent, or Firm*—Gregg, Hendricson, Caplan & Becker

[57] ABSTRACT

A machine for inserting quilting buttons of the type described in U.S. Pat. No. 3,701,174 includes a multiple displacement upper piston mechanism with movable upper button feed means and a dual displacement lower piston mechanism and a movable lower button feed mechanism. Upon an open work bed between the upper and lower mechanisms, a quilt or the like is positioned so that actuation of the machine to pick up button parts and insert them in the quilt causes the two mechanisms to come together on opposite sides of the quilt and for the female button portion to be forced through the quilt, followed by forcing of the male button portion through the female portion. Retraction of the mechanisms leaves the quilting button inserted through the quilt and the mechanisms in condition for another button insertion.

8 Claims, 22 Drawing Figures

2
54
52
51
58
57
56
59
61
33
62
66
71
86
36
83
84
43
79
47
43
41
42
45
136
137
138
119
37
44
49
103
120
113
111
34
108
103
116
39
118
2

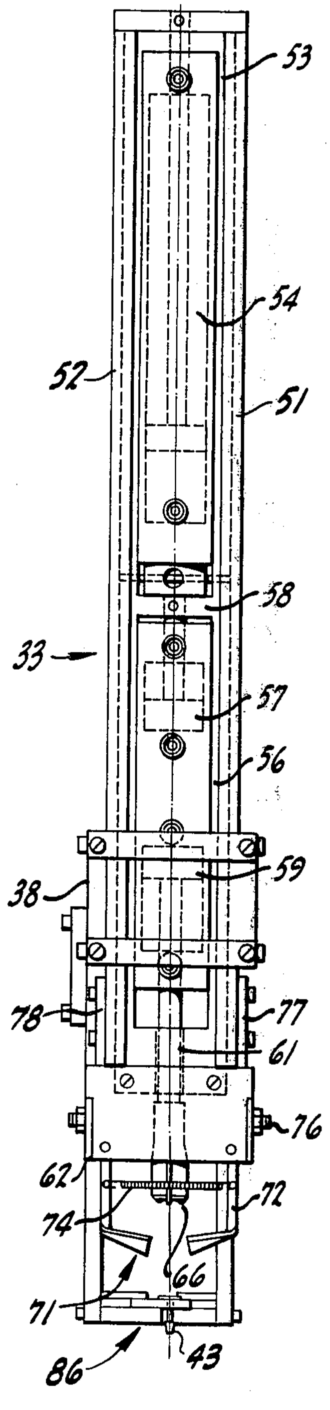
FIG-4
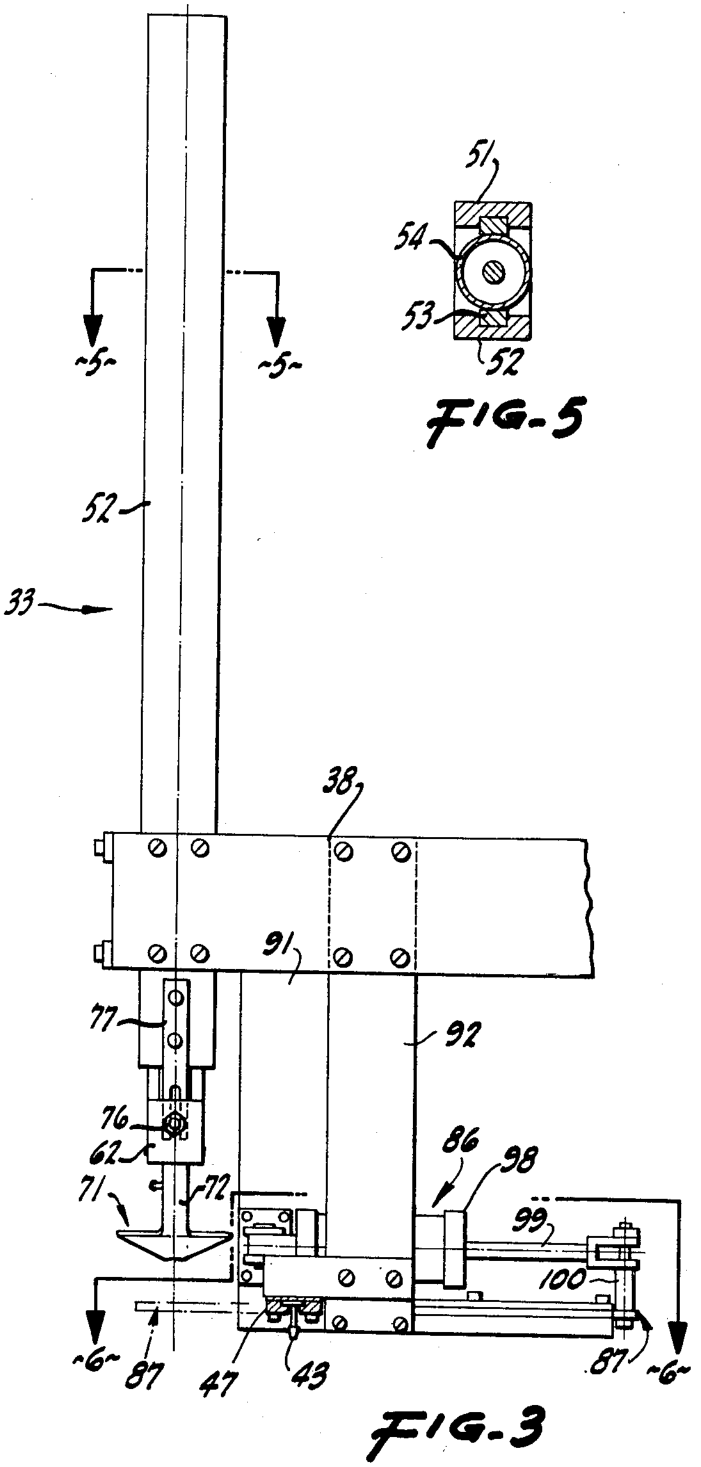
FIG-3
FIG-5

FIG. 10
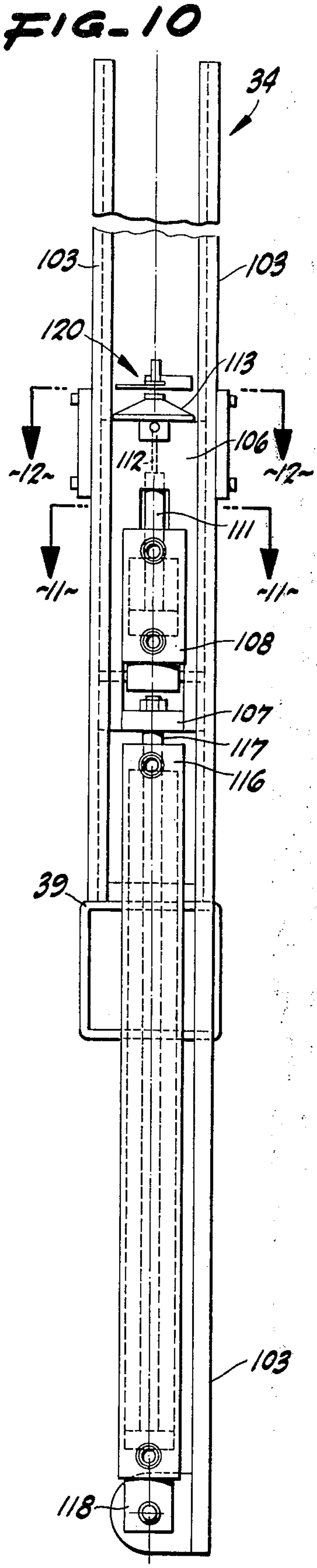
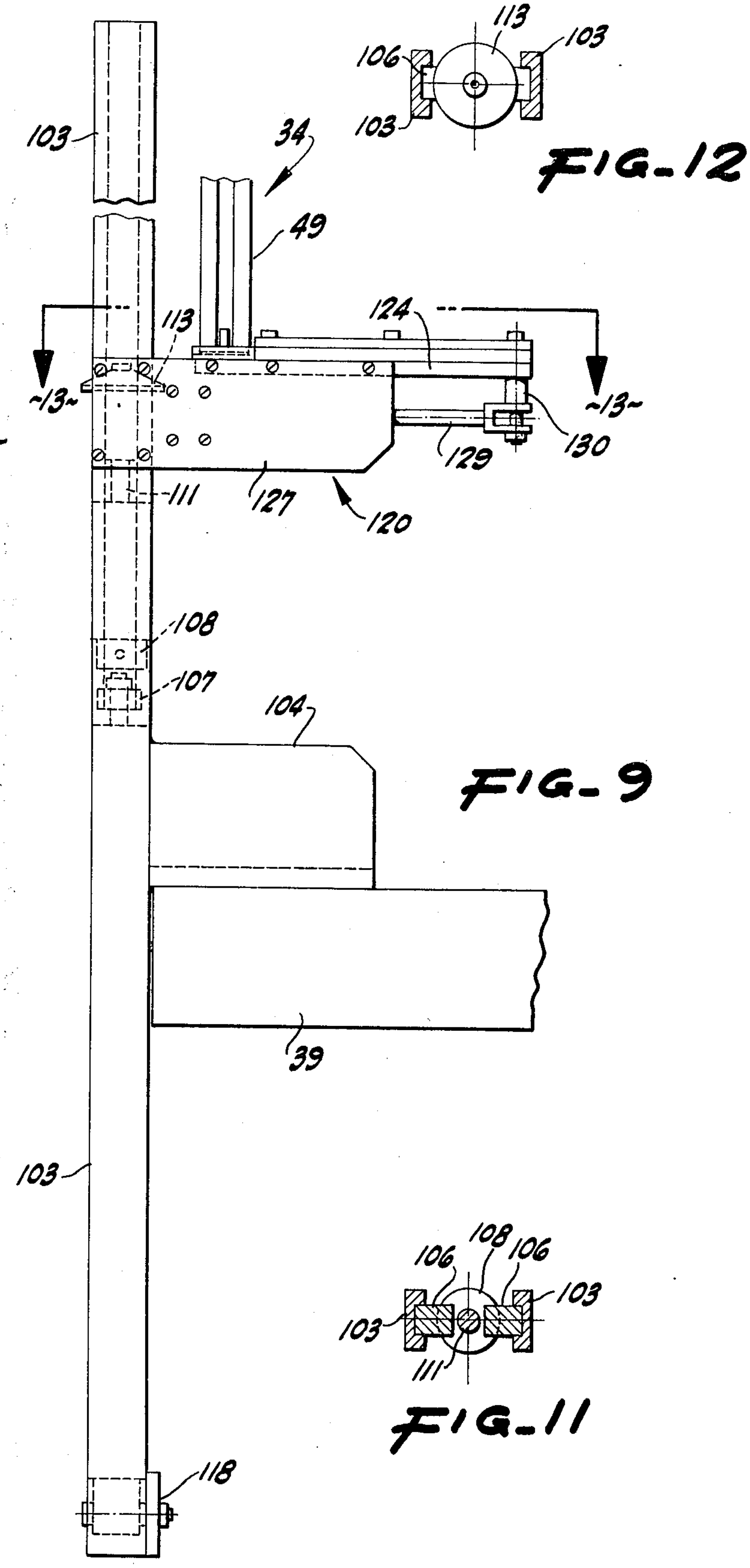
FIG. 12
FIG. 9
FIG. 11

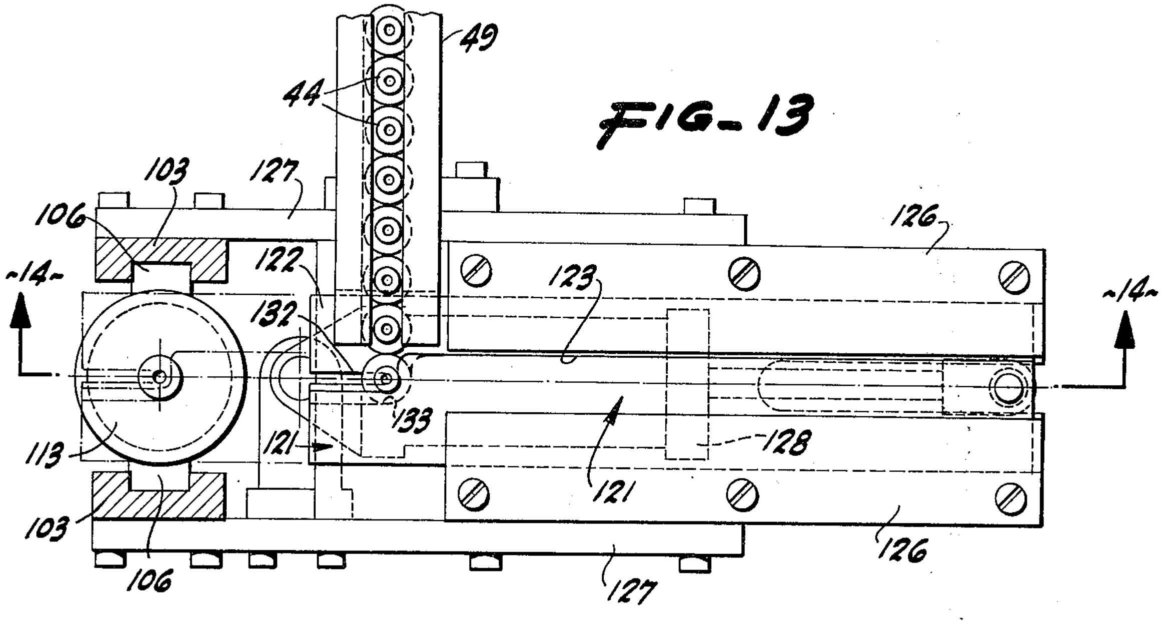
FIG-13
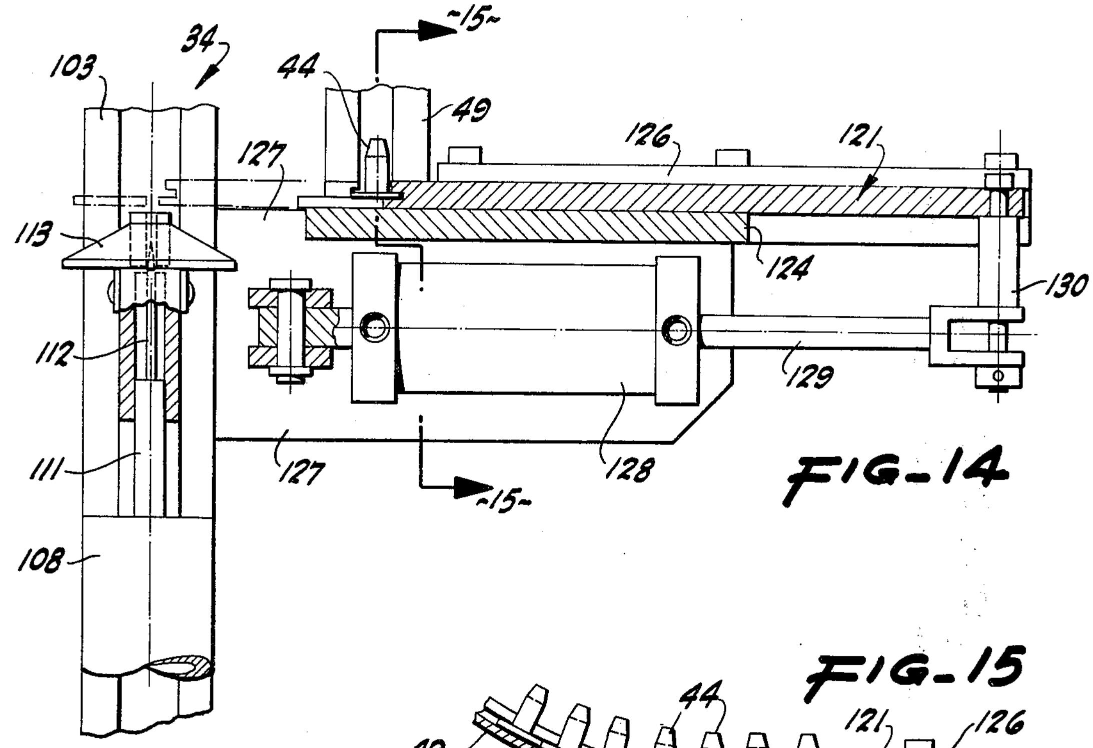
FIG-14
FIG-15
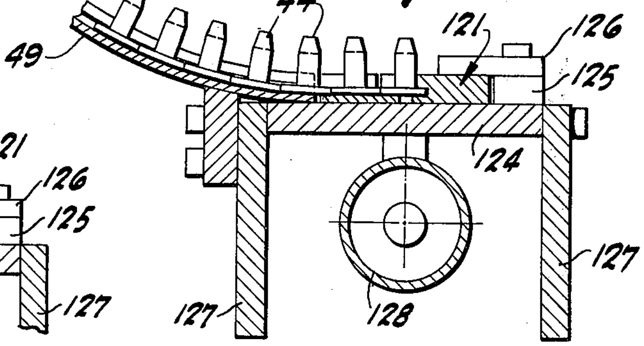
FIG-16
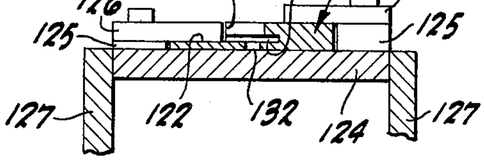

QUILTING MACHINE

BACKGROUND OF INVENTION

It has long been known to quilt material by tying together the opposite sides of a composition or sandwich having cloth or the like on opposite sides of a compressible filler material. In commercial operations involving quilting, as for the production of quilts, mattresses and the like, there have been developed a variety of different quilting methods oftentimes includng internal hooks, strings and the like.

A material advancement in the field of quilt and cushion construction is provided by the invention of U.S. Pat. No. 3,701,174, setting forth both a novel and advantageous quilting button and method of applying same to quilts and the like. The present invention is particularly directed to a machine for inserting the quilting button of the above-noted patent for tieing together the top and bottom covers of a quilt, mattress, cushion, pad or the like, and to compress the filler material thereof.

Referring again to the industrial production of quilts, mattresses and the like, it is noted that the rapidity with which quilting operations are performed and the simplicity of materials employed are quite important. The present invention utilizes a very inexpensive quilting button and applies such buttons in a quilting operation very rapidly so as to thus materially advance the art of quilting.

SUMMARY OF INVENTION

The present invention comprises a machine for automatically inserting male and female parts of a quilting button through a quilt or cushion so that the button parts lock together. A button of the type employed in the present invention is shown and described in U.S. Pat. No. 3,701,174 and, in general, comprises a male member having a head with a shank attached to one end of a flanged head and a tapered tip at the other shank end forming an outside shoulder spaced from the head end. The button also includes a female member having a flanged head with a shank attached to one end of the head and a tapered tip at the other end with the shank having a passage extending therethrough from end to end and through the head, such passage being formed with an inside shoulder spaced from the tip end of the shank and cooperating with the outside shoulder on the male member to prevent withdrawal of the male member when it is inserted in the female member. The tip end of the female member is resilient to permit insertion of the male member. The present invention is capable of carrying out the method of the above-noted patent which includes engaging the female button member with a needle extending therethrough and the point thereof extending from the tip and forcing the female member through top and bottom quilt covers and compressible expandable filler material of a quilt or the like and then advancing the male member toward the projecting tip of the needle in axial alignment therewith. With the female member held in position, the male member is then inserted in the female member as the needle is withdrawn so that the male and female members of the quilting button are locked together in extension through the quilt or the like.

The quilting machine of this invention includes a centrally disposed work bed which may include a movable carriage adapted to hold a quilt, pad, or the like, to be operated upon and disposed between male and female button part holders with one holder above the work bed location and one below. Male button feed means above the workpiece include a slide member receiving successive button parts and movable into position aligning the button part with a male button part holder. This male holder includes a multiple displacement drive means such as a plurality of axially aligned pneumatic or hydraulic cylinders or solenoids. The male holder extends to pick up a single male button part and then retracts followed by retraction of the feed means slide away from the holder. Female button feed means below the workpiece include a particularly configured slide accepting one button part at a time from a continuous feed and retaining the part against vertical displacement. This slide moves to align the retained button part with a needle extending axially upward from the female button part holder which includes a dual displacement drive means again provided as cylinders or solenoids for pickup of the button part and insertion of same in the workpiece. With both holders containing a button part, the two holders are then moved toward each other into engagement with the quilt or workpiece with a deflector or the like on the upper male holder depressing the quilt and the lower holder driving the female button part with the pin extending therefrom through the quilt into an opening in this deflector or the like in the male holder. The male holder is then further driven downwardly while the needle portion of the lower holder is retracted so that the male and female portions of the quilting button are engaged with each other to thus lock together the two portions of the quilting button.

The above-noted mechanism of the present invention is automatically operated, with the sequence of events being substantially as stated, so that an operator merely actuates the machine which then automatically performs each of the stated functions and is then in position to commence the next cycle of operation when the quilt or the like is moved to desired position and the machine actuated. A quilting button may be inserted by the present invention in three seconds and thus the invention is admirably suited to industrial application.

DESCRIPTION OF FIGURES

The present invention is illustrated as to a single preferred embodiment thereof in the accompanying drawings, wherein:

FIG. 3 is a partial enlarged side elevational view of the male button holder and drive of the machine of FIGS. 1 and 2;

FIG. 4 is an end elevational view of the male button holder and drive of FIG. 3;

FIG. 5 is a transverse sectional view taken in the plane 5—5 of FIG. 3;

FIG. 9 is a side elevational view of the female button holder and drive of the present invention;

FIG. 10 is an end elevational view of the female button holder and drive of the present invention;

FIG. 11 is a transverse sectional view taken in the plane 11—11 of FIG. 10;

FIG. 12 is a transverse sectional view taken in the plane 12—12 of FIG. 10;

FIG. 13 is a plan view of the female button part feed means and taken in the plane 13—13 of FIG. 9;

FIG. 14 is a longitudinal sectional view taken in the plane 14—14 of FIG. 13;

FIG. 15 is a transverse sectional view taken in the plane 15—15 of FIG. 14;

FIG. 16 is a transverse sectional view taken in the same plane as FIG. 15, but excluding the button track and buttons;

FIG. 20 is a sectional view of the quilting button having the portions thereof engaged and extending through a quilt or the like;

DESCRIPTION OF PREFERRED EMBODIMENT

Figure 1:
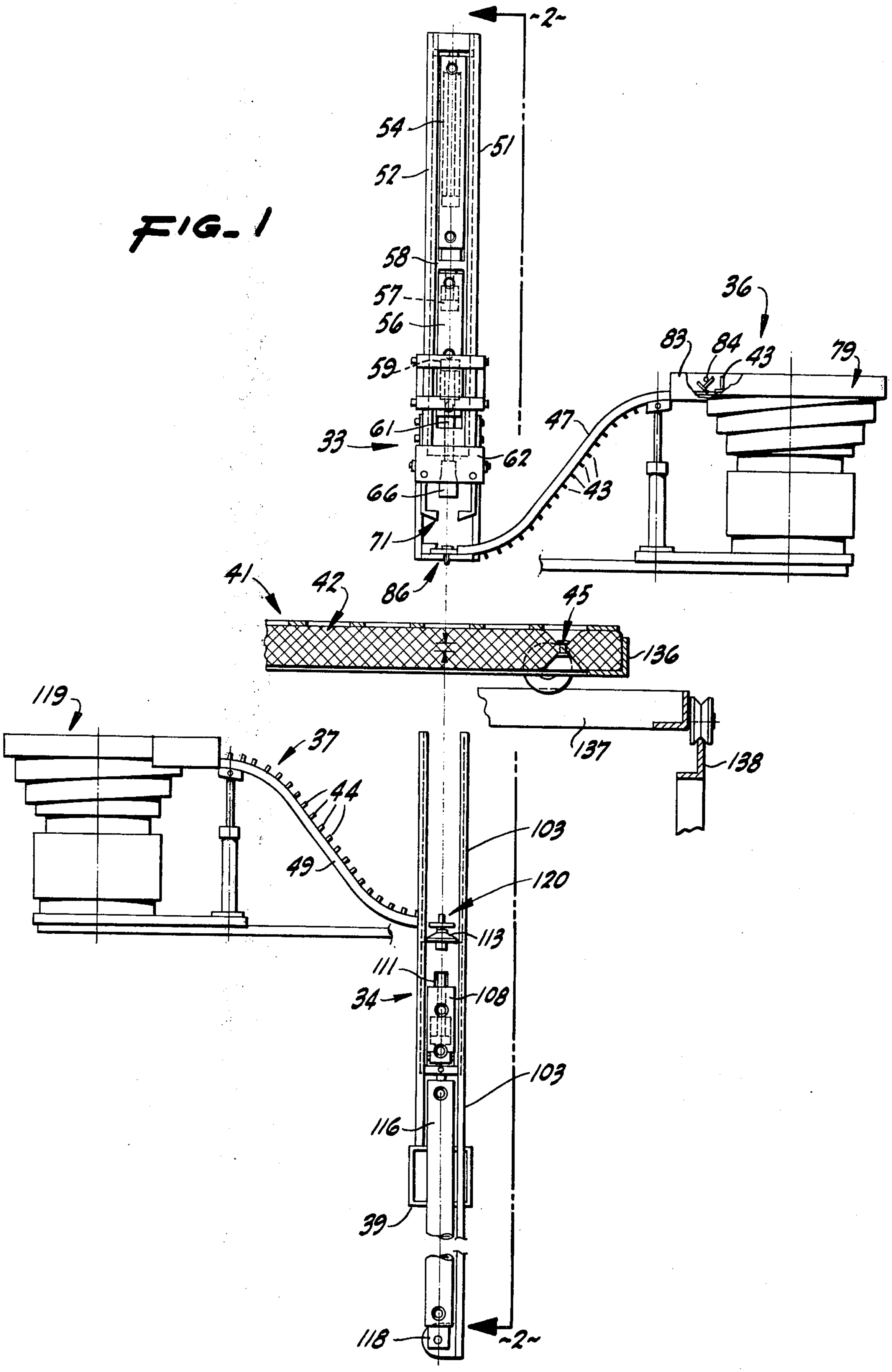
FIG. 1 is an end elevational view of the machine of the present invention.
Figure 2:
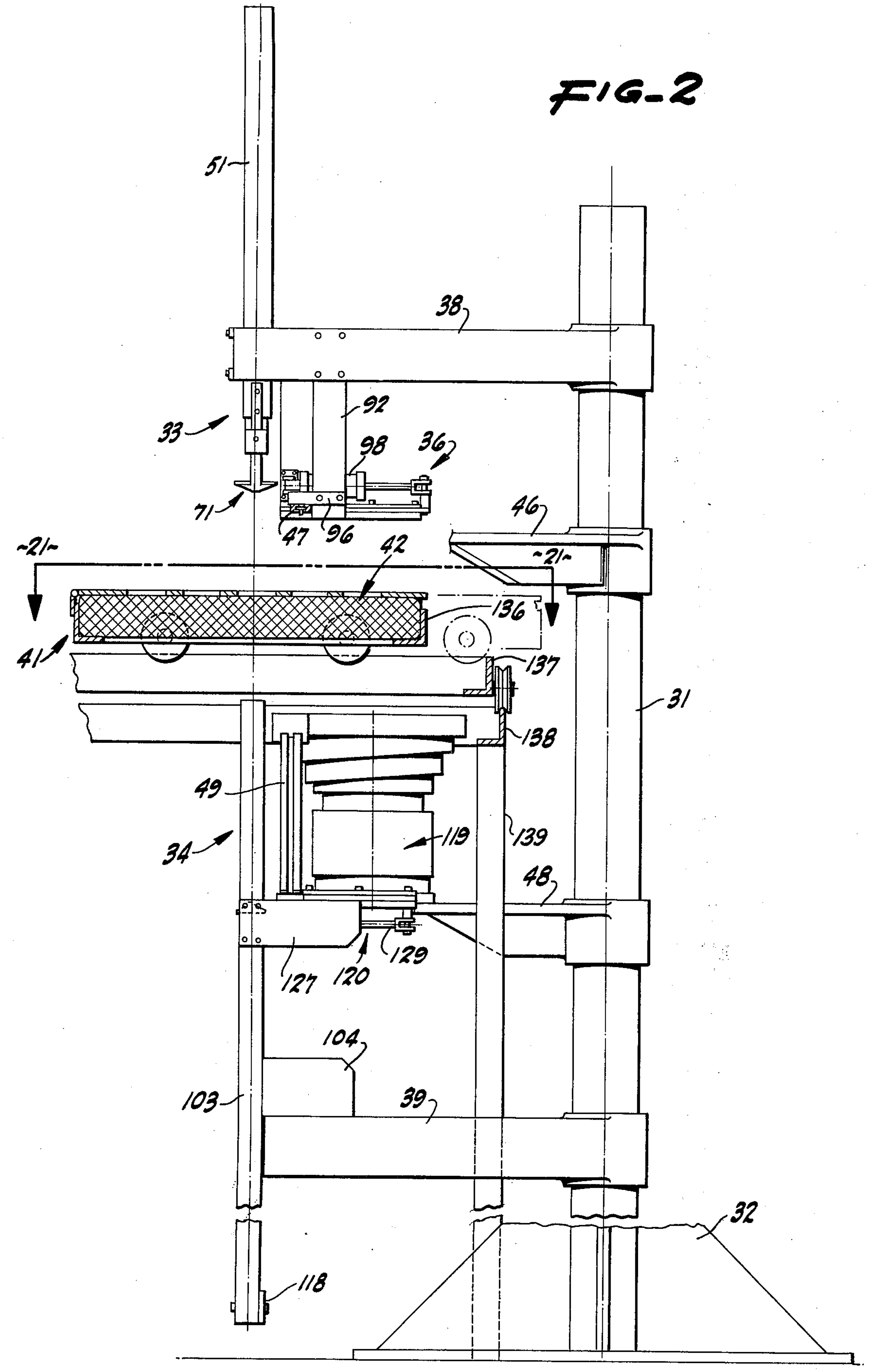
FIG. 2 is a side elevational view of the machine of the present invention showing structural support means thereof and taken in the plane 2—2 of FIG. 1.

A preferred embodiment of the present invention, as generally illustrated in FIGS. 1 and 2, includes a central vertical support column 31 having a floor base 32 and supporting an upper male button holder 33 and lower female button holder 34. Also mounted on this support column 31 is an upper male button feed mechanism 36 and lower female button feed mechanism 37. The male and female button holders 33 and 34 may be mounted on the column 31 by arms 38 and 39, respectively, which may, if desired, engage the column for angular adjustment about the column and adjustment longitudinally of the column. The male and female holders 33 and 34 are axially aligned and between these holders there is provided work support means or the like 41 adapted to hold or carry a workpiece 42 that may be formed as a central expandable-compressible material having top and bottom covers and adapted to receive a quilting button as applied by the mechanism of the present invention. Such a button is illustrated in FIG. 20 as including a male portion 43 and female portion 44 adapted to be locked together when the male portion is inserted into the female portion, as illustrated. Reference is made to this figure during the following description of the mechanism of the present invention, particularly as regards the desired engagement of button parts in order to accomplish the completion of a quilting button in accordance with the present invention.

It will be appreciated that the physical relationship of male and female holders and upper and lower feed mechanisms is of substantial importance in the overall machine of the present invention and consequently the upper feed mechanism is also mounted upon the support column 31 by adjustable means 46 providing for angularly displacing adjustment and adjustment longitudinally of the column 31. The upper feed means 36 includes track means 47 along which the male button portions 43 move for pickup by the holder 33 and there is also provided a slide mechanism as part of the upper feed means in order to position successive male button portions 43 for pickup by the upper holder, as described below. The lower feed means 37 is also preferably mounted as by means 48 on the column 31 with this latter mounting means providing for both angular adjustment relative to the column and longitudinal adjustment relative thereto. The lower feed means 37 providing female button parts for pickup by the female holder 34 includes a track 49 along which female button parts 44 move for pickup by the holder 34, and there is also provided as a part of the lower or female feed means a slide mechanism, as described below.

Considering now the male holder and feed mechanism and referring first to FIGS. 3, 4 and 5, it will be seen that the holder 33 is comprised as a pair of vertical tracks 51 and 52 joined together by a crosspiece at the top and secured together near the bottom with a slide frame 53 disposed in facing grooves in the two tracks for movement of the frame longitudinally of the tracks. The tracks are maintained in vertical position by support arm 38 secured thereto. Within an upper opening in the frame 53 there is disposed a first pneumatic cylinder 54 fixed in position in the frame and having a piston rod extending upwardly through an opening in the frame into engagement with the top crosspiece of the tracks. Within a lower opening in the frame 53 there is disposed a double piston cylinder 56 having an upper piston 57 with the rod thereof extending upwardly from the cylinder into engagement with a central crosspiece 58 of the frame. The cylinder 56 is slidably mounted in the frame for movement longitudinally thereof and also includes a lower piston 59 having a piston rod 61 extending downwardly through an opening in the bottom of the frame. A central cylinder head is disposed across the cylinder between the pistons 57 and 59 so that each piston may be independently operated. Below the tracks 51 and 52 there is provided a head 62 connected to the lower end of the frame 53 and movable therewith. This head 62 may be formed as an open rectangle through which the piston rod 61 is free to move.

Figure 19:
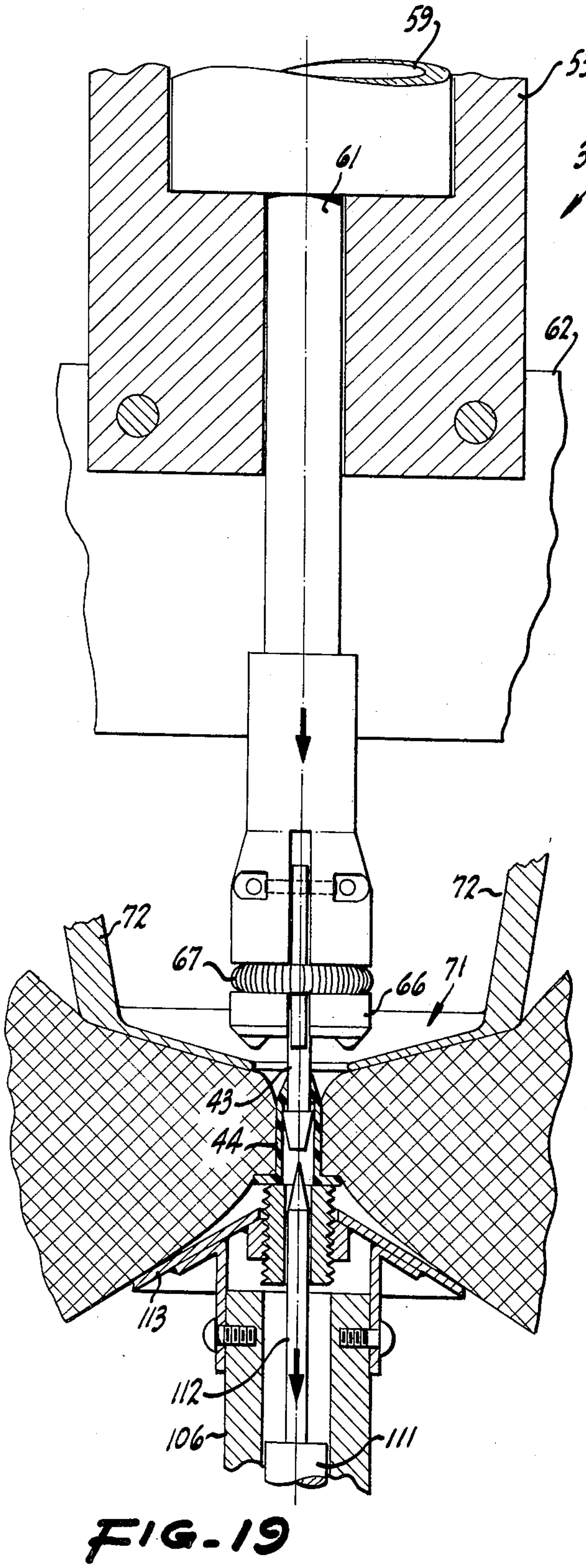
FIG. 19 is a partial enlarged elvational sectional view of the male and female holders in position engaging the male and female button portions of the quilting button.
Figure 17:
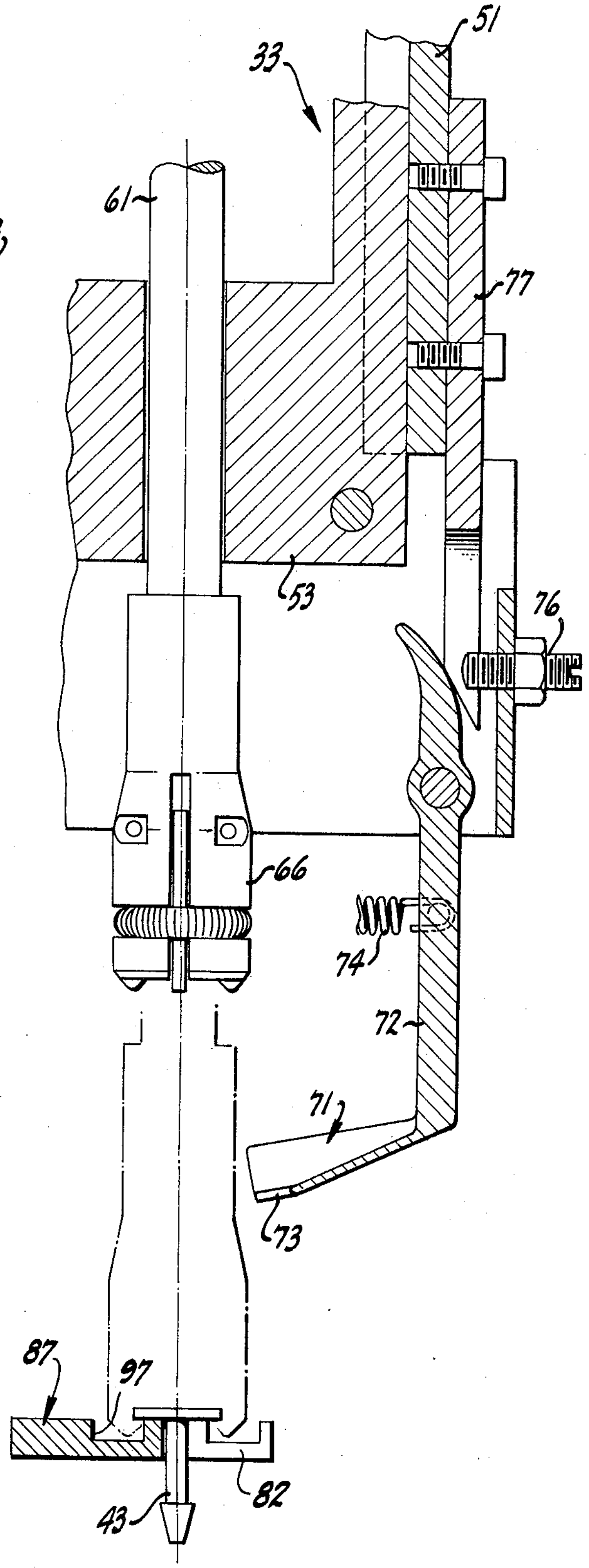
FIG. 17 is a partial enlarged elevational view of the male holder illustrating the relationship thereof to the upper feed mechanism in alignment therewith for pickup of a male button portion.
Figure 18:
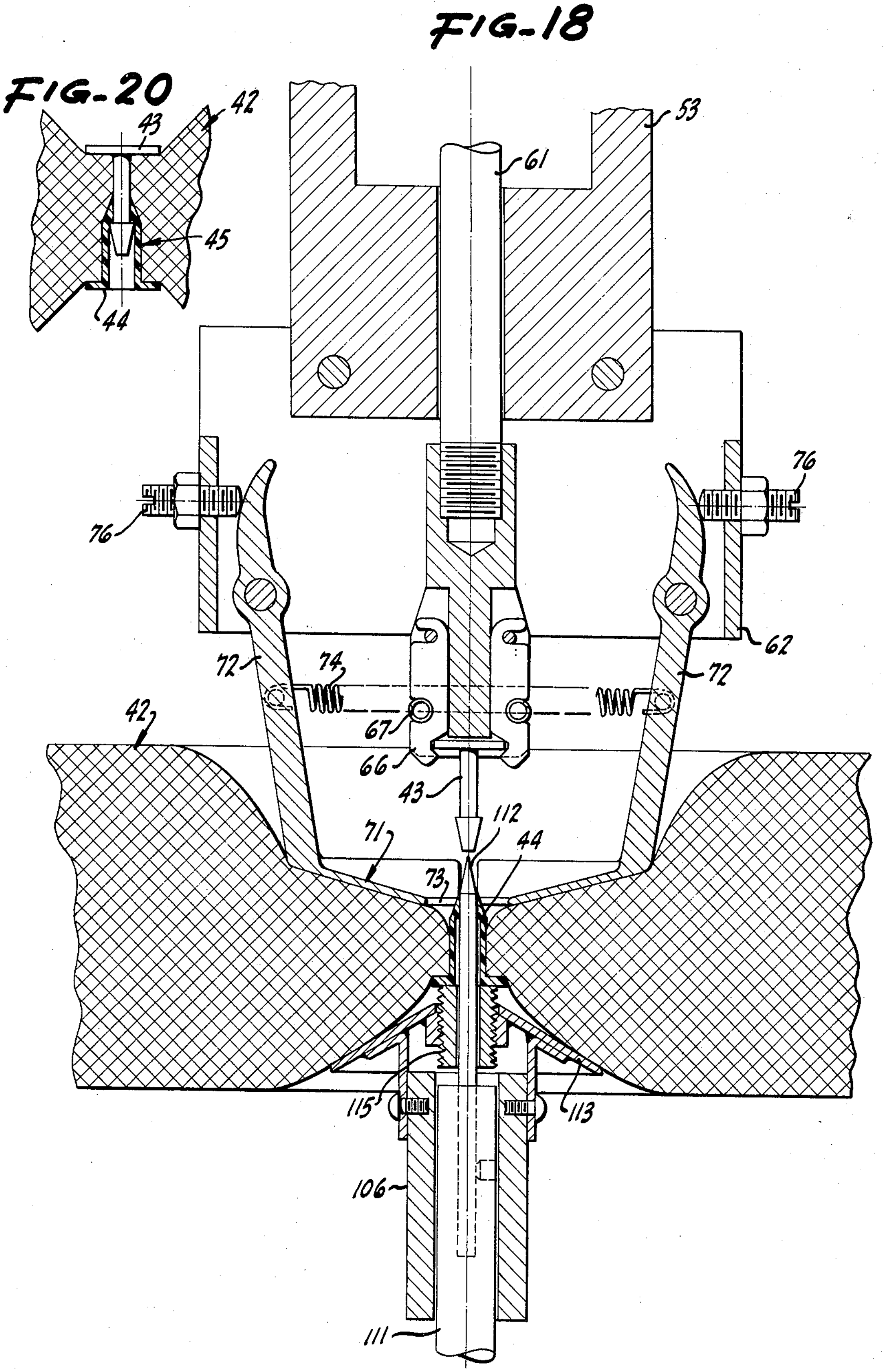
FIG. 18 is a partially enlarged elevational sectional view of the male and female button holders in position immediately prior to insertion of the male button portion into the female button portion.

Details of the lower portion of the male button holder are shown in FIGS. 17 to 19 and, referring thereto, there is illustrated spring loaded jaws 66 pivotally mounted on the bottom of the piston rod 61 and urged into closed position by a small coil spring 67 about the jaws. Mounted upon the head 62 and depending therefrom is a deflector 71 illustrated to be formed as a split cone directed downwardly and each half thereof carried by an upright arm 72 pivotally mounted in the head 62. Each side of the conical deflector has a semicircular opening at the apex thereof to provide a circular opening 73 through which a male button portion shank may extend, as described below. Additionally, the arms 72 of the deflector are urged together by a spring 74 connected therebetween so that the split edges of the conical halves of the deflector normally engage each other. Locking adjusting screws 76 are provided through the sides of the head 62 for engagement with the upper ends of the deflector arms 72 as best illustrated, for example, in FIG. 18.

Also forming a part of the male button holder is a pair of bars 77 and 78 depending from the outside of the tracks 51 and 52 and extending into the head 62. These bars 77 and 78 are disposed in position to engage an inwardly curved portion at the top of each of the deflector arms 72 so that, with the frame 53 fully raised in the tracks 51 and 52, these bars 77 and 78 engage the deflector arms to spread the deflector apart and thereby provide adequate space for the jaws 66 to move vertically through the deflector without contacting the deflector cone. This structure, as illustrated in FIG. 17, for example, will be seen then to pivot the deflector apart against the force of the spring 74 when the frame is fully withdrawn upwardly in the tracks and also to release the deflector arms so that the conical deflector comes together as the frame is lowered in the tracks. This split cone deflector is needed to provide a small aperture through which the needle and tip of the button 44 can pass to penetrate the cover of the quilt or cushion without tearing the cover.

Considering now the upper feed mechanism 36 in some further detail and referring in particular to FIGS. 1, 2, and 6 to 8, the mechanism is shown to include a male button part dispenser 79 such as an ultrasonic feeder including a vibration generator 81 and a feeder bowl 82 having a spiral ledge extending upwardly about the interior thereof. Male button parts 43 disposed in quantity in the bowl 82 move individually along the ledge upwardly to an exit chute 83 as the bowl is vibrated. This dispenser is conventional and the spiral ledge therein has a width about equal to the diameter of the head of the button part. A pin 84 extends transversely across the ledge near the top of the bowl at a distance above the ledge that is slightly greater than the diameter of the base of the button part for tipping over any button part that arrives thereat in an upright condition. The chute 83 leads to the track 47 which has a central longitudinal slot therein so that the shank of each button part falls through the slot and the button parts move down the track with the upper flanged end of the button parts riding in the track, as illustrated, for example, in FIG. 8.

As a portion of the upper feed means 36 there is provided a slide mechanism 86 at the lower end of the track 47 and including a slide bar 87 having a slot 88 in the side thereof normally aligned with the slot on the track 47 at the lower end of the track. The slide mechanism 86 includes a base plate 89 mounted in a horizontal position between a pair of support plates 91 and 92 that are secured in depending relation from the male holder support arm 38. The slide bar 87 rests upon the base plate 89 in slidable relation thereto, and on each side of the slide bar there is provided a spacer bar 93 and atop each spacer bar there is provided a cover plate 94 with machine bolts securing the cover plates, spacer bars and base plate together to define a slideway for the slide bar 87. A mounting bar 96 is bolted to one of the support plates 92 and extends outwardly therefrom into engagement with the lower end of the track 47 for supporting the track thereat.

Figure 6:
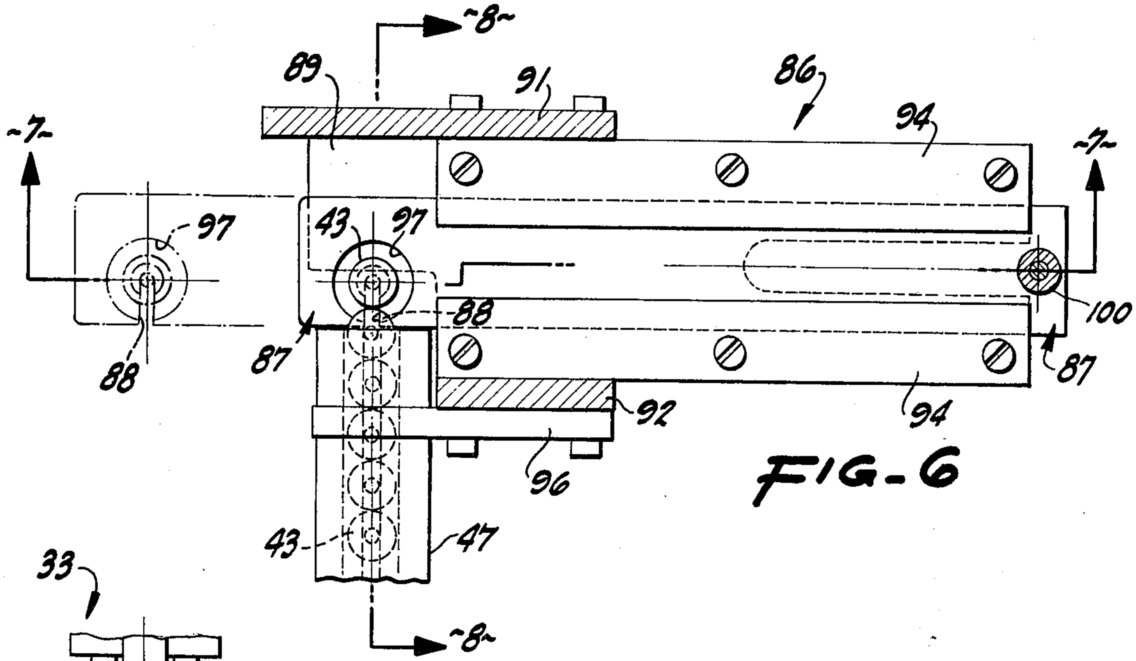
FIG. 6 is a longitudinal sectional view of the male button feed means taken in the plane 6—6 of FIG. 3.
Figure 7:
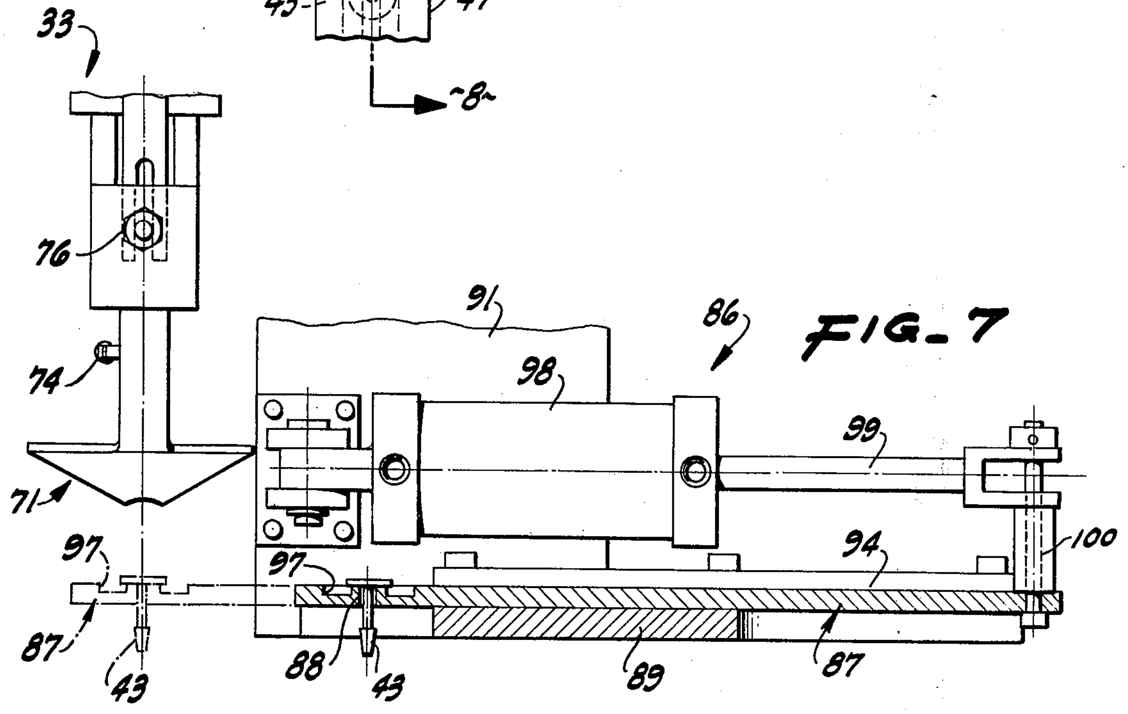
FIG. 7 is a sectional view taken in the plane 7—7 of FIG. 6.
Figure 8:
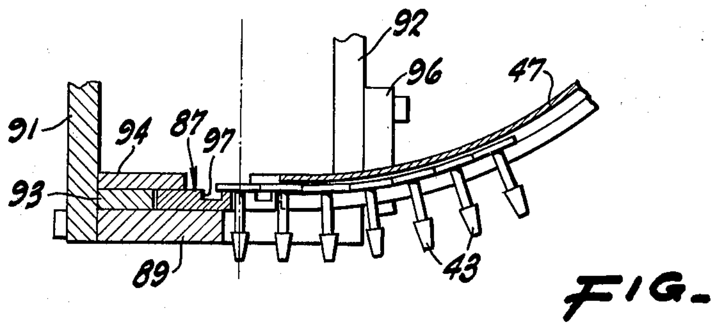
FIG. 8 is a transverse sectional view taken in the plane 8—8 of FIG. 6.

The slide bar 87 is adapted to receive male button parts 43 with the shank of such a part sliding in the slot 88 in the slide bar, as illustrated in FIGS. 6, 7 and 8, and it will be seen that the base plate 89 has the leading edge thereof relieved or offset, in order to provide space for the shank of the button part to move into the slot in the slide bar. An annular depression 97 is formed on the upper surface of the slide bar about the head or flanged portion of the male button part 43 thereon. It will be noted that the length of the slot 88 in the slide bar 87 is just sufficient for the first button part to move to the end of the slot as urged by the next button part, and yet to maintain the shank of the next button part outside of the slot alongside of the slide bar, as indicated in FIG. 6.

The slide bar is operable by a loading cylinder 98 mounted upon the support plate 91 in a horizontal position and having a piston rod 99 extending therefrom for enagement with a drive pin 100 that is coupled to the slide bar 87. The loading cylinder 98 may be hydraulically or pneumatically operated to move the slide plate to the left in FIGS. 6 and 7 into the dashed position shown therein, wherein the button part 43 carried thereby is aligned with the axis of the male holder and drive 33. It will be appreciated that the physical location of the slide mechanism 86 is such that adequate clearance is provided to allow the deflector 71 to move past the slide mechanism. In the extended or feed position of the slide bar 87, the annular depression 87 thereon is aligned with the jaws 66 of the male holder so that the male button part may be picked up by these jaws in the manner illustrated in FIG. 17 and further described below. Following removal or pick-up of a male button part from the extended slide bar, the loading cylinder 98 is operated to retract the slide bar by sliding it back into the position illustrated in solid lines in FIG. 6, so that the next button part slides into the slide bar and the mechanism is again ready to feed a male button part into position for pick-up by the male holder.

Further with regard to the slide bar 87, it is noted that the radial width of a side of the annular depression 97 is less than the diameter of the male button top flange, so that the button readily slides over the depression to rest on the central raised portion of the slide bar. It is also noted that the diameter of the central raised portion interiorly of the annular depression 97 is less than the diameter of the male button top flange, so that the periphery of the button top or flange overhangs the depression and is consequently available for gripping by the jaws of the holder. The successive steps of pick-up and insertion of the male button portion of the quilting button, in accordance with the present invention, is described below in connection with the pick-up and insertion of the female button portion.

Considering now the female button holder and drive of the present invention and referring particularly to FIGS. 10 to 12 of the drawings, there will be seen to be provided a vertical track frame 103 comprising a pair of parallel vertical members with facing slots therein joined together at the top and bottom to form a rigid structure and having a lateral support member 104 secured to the support arm 39. Within the track frame 103 there is disposed a slide frame 106 fitting into the facing longitudinal slots on the interior sides of the track frame so as to be movable longitudinally of the frame. The slide frame 106 may be generally comprised as an inverted U-shaped member with a plate 107 secured across the depending legs thereof at the bottom of the slide frame. Within the slide frame 106 there is mounted a pneumatic cylinder 108 hereinafter termed an upper or needle cylinder with the lower end thereof pinned to the depending legs of the side frame and having a piston rod 111 extending upwardly from the needle cylinder 108 through an opening in the top of the slide frame 106. A pointed cylindrical needle 112 is mounted in axial extension from the outer end of the piston rod 111. As illustrated in FIG. 18, for example, a conical deflector 113 is secured to the upper crosspiece of the slide frame 106 and is provided with a central circular opening therethrough in which there is threaded an apertured needle guide 115 through which the needle 112 extends. The upper surface of the needle guide 115 is adapted to carry the flanged end of the female button portion 44 and the needle guide will be seen to be adjustable to set the button portion in desired adjusted position. Locking means, not shown, may be provided to fix the adjusted position of the needle guide.

Beneath the slide frame 106 there is provided a second vertical pneumatic cylinder 116, hereinafter termed the drive cylinder, with a piston rod 117 extending upwardly therefrom into connection with the lower plate 107 of the slide frame. The drive cylinder 116 is elongated to extend below the support arm 39 and one side of the track frame 103 extends downwardly and carries at the bottom thereof a cylinder mount 118 to which the drive cylinder 116 is secured.

It will be seen that the above-described structure of the female holder provides for upward movement of the needle 112 by application of pressure to the needle cylinder 108 and this will drive the needle 112 through the conical deflector 113. The slide frame 106 is vertically movable by operation of the drive cylinder 116.

Considering now the lower feed means 37 and referring to FIGS. 1, 2 and 13 to 16, there will be seen to be provided a female button part dispenser 119 which is substantially the same as and is employed in the upper feed means 36. The dispenser 119 is mounted on the arm 48 and the track 49 extends downwardly from the dispenser bowl with the track being formed as a channel with inturned upper edges so as to accommodate passage of a female button part 44 resting upon the circular base thereof and having the shank extending upwardly between the channel sides. The track 49 extends downwardly to a lower slide mechanism 120 including a lower slide bar 121 which has a side ledge 122 extending longitudinally thereof. The track 49 has the floor thereof extending into continuous relation with the edge of the slide bar ledge 122 and the side walls thereof extending over this ledge adjacent a side wall 123 of the slide bar defining the edge of the ledge 122 thereon.

The mounting of the lower slide bar 121 is similar to the mounting of the upper slide bar 87 in that there is provided a base plate 124 upon which the slide bar 121 rests with side spacer bars 125 alongside the slide plate on the base plate and cover plates 126 upon the spacer bar and extending over the lateral edges of the slide bar 121. The cover plates and spacer bars may be bolted to the base plate to thereby define a slide way or the like along which the slide bar 121 may move toward and away from the axis of the female holder assembly 34. The slide mechanism 120 is mounted upon the female holder assembly 34 by support plates 127 bolted to the track frame 103 and to the base plate 124 in depending relation to the base plate.

The lower slide bar 121 is adapted to be moved from the position shown in the full lines in FIGS. 13 and 14 into the extended position shown in dash lines in these figures. This movement is accomplished by the provision of a drive cylinder 128 mounted on one of the support plates 127 and having a piston rod 129 extending therefrom into engagement with a drive pin 130 which engages the slide bar 121. In the particular embodiment of the present invention illustrated in the drawings, there is provided a longitudinal slot in the base plate for accommodating passage of the drive pin 130 when the slide bar is extended from normal position. However, it will be appreciated that the base plate may merely be reduced in length so that the cylinder 128 may be employed to operate the slide bar 121 without interference with the base plate.

Considering further the slide bar 121 and the particular construction thereof, it is again noted that this slide bar has a reduced height on the left side thereof as viewed, for example, in FIG. 16 to form the ledge 122 which fits under the extending side walls of the track 49. The upstanding portion of the slide bar adjacent the ledge 122 forms a side wall 123 and the leading portion of this upstanding part of the slide bar is cut away or offset to form a shoulder 131 with the bottom of the offset level with the ledge 122. An end slot 132 is formed through the slide bar 121 longitudinally thereof from the leading edge of the slide bar with the width of this slot 132 being substantially equal to the diameter of the needle 112 of the female holder and drive means. The side of the shoulder 131 is displaced from a center line of the slot 132 a distance substantially equal to the radius of the shank of the female button part 44 and the end or back of the shoulder 131 is displaced from the center of curvature of the end of the slot 132 a distance also equal to the radius of the shank of the female button part 44. In addition, there is provided in the slide bar 121 a horizontal undercut or slot 133 in the upstanding or higher portion of the slide bar beneath the side and end portion of the shoulder 131 horizontally aligned with the ledge 122 and having a depth equal to the radial extent of the flanged portion of the button part part 44 exteriorly of the shank thereof. This structure is particularly illustrated in FIGS. 13 and 16. Referring again to FIG. 13, it is noted that female button part 44 fed to the slide mechanism 120 by the track 49 moves onto the ledge 122 of the slide bar 121 at the urging of following buttons and vibration of the track and the outermost button will then move into the forward cutout portion of the slide bar with the button flange entering the horizontal undercut or slot 133 so as to dispose the shank of the button part 44 in alignment with the inner end of the slot 132. Upon actuation of the drive cylinder 128, the slide bar moves to the left in FIGS. 13 and 14 so that the side wall 123 engages the following button of the track and the the slide bar carried one button into axial alignment with the needle 112 of the female holder and drive means 34. The needle 112 is dimensioned to tightly engage the reduced diameter portion of the central bore of the female button part. With the slide bar 121 extended to axially align the female button part with the needle 112, vertical movement of the needle upwardly will drive the needle through the button part. It is particularly noted that more than one-half of the area of the button part flange or base is disposed within the horizontal slot 133 of the slide bar, i.e., beneath the shoulder 131 so that vertical movement of the button part is prevented during movement of the needle through the button part. The slide bar 121 is then retracted by means of the drive cylinder 128 so that the needle moves relative to the drive bar 121 through the slot 132 with the needle retaining the button part thereon. The operation of female button part insertion during mating of the button parts for quilting operations is described below.

Figure 21:
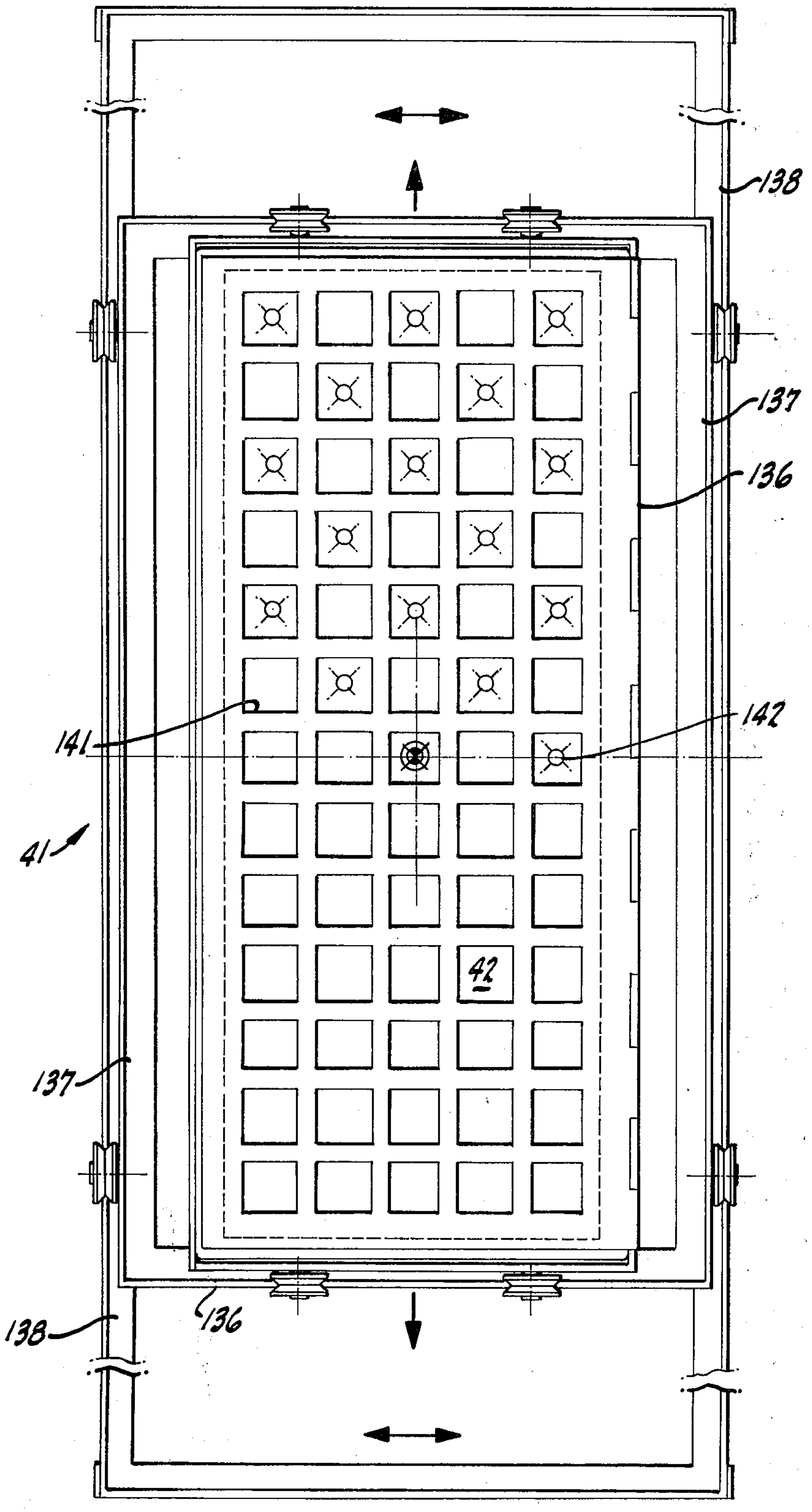
FIG. 21 is a plan view of the work table and carriage taken in the plane 21—21 of FIG. 2.

The machine of the present invention is, as noted above, adapted to insert male and female button portions in a pad, quilt, mattress or the like, for locking together such portions as quilting buttons in the work product. There has been described above the male and female button holder and drive means and feed mechanisms therefor and between these vertically aligned holders and mechanisms there is disposed the work support means 41 within which the workpiece 42 is disposed, for example, upon a carriage 136 having wheels movable in the tracks of a base carriage 137 having wheels movable in tracks 138 disposed perpendicular to the direction of movement of the carriage 136 in the tracks of the base carriage 137, as shown in FIGS. 2, and 21. This then provides for movement of the workpiece 42 in either or both of two orthogonal directions to thus dispose any desired portion of the workpiece between the axially aligned male and female button holders 33 and 34. The fixed tracks 138 may be mounted upon upright support members 139 resting on the floor. It will be appreciated that the carriage 136 and base carriage 137 are provided only as open peripheral frame members with open grids so that substantially the entire upper and lower surfaces of the workpiece are exposed for engagement by the male and female button holders. An operator may readily move the workpiece via the carriage 136 and base carriage 137 into any desired orientation relative to the common axes of the button holders so as to provide for application of a quilting button to the workpiece at such point. The operator then may move the workpiece into position for the next quilting button application. It is also possible to provide for automatic movement of the workpiece via the carriage and base carriage or other workpiece movement means if desired. There may also be provided a templet 141, formed as a flat plate mounted by hinges on the carriage 136 to overlie the workpiece and having apertures 142 for locating points of quilting button insertion.

Considering now the operation of the present invention as described above, the feed dispensers 79 and 119 are loaded with male and female button parts, respectively, and the dispensers are energized so that the button parts move upwardly on the ledges to feed button parts into the tracks 47 and 49. With regard to the upper male holder and drive means 33, a male button part 43 fed onto the slide bar 87 is moved into alignment with jaws 66 by operation of the cylinder 98 and both pistons 57 and 59 of cylinder 56 are then operated to move the jaws downwardly into engagement with the button part 43, as shown in the dashed position of FIG. 17. It will be noted that the jaws are expanded in passage over the top of the button part to enter the annular recess 97 and thus to fit beneath the head of the button part. The cylinder 56 is then actuated to retract the jaws 66 holding the button part and the slide bar 87 is retracted by cylinder 98 to thus receive the next button part for feeding to the drive means. Simultaneously the lower slide bar 121 with a female button part disposed thereon under the shoulder 131 thereof is moved into alignment with the lower holder and drive means 34 by operation of the drive cylinder 128. The cylinder 108 of the lower holder is then operated to move the needle 112 upwardly and drive this needle through the female button part 44 on the slide bar 121. It is noted that the button part 44 is retained against vertical displacement by the slide bar 121 so that the needle can be driven through the button part. The slide bar 121 is then retracted by the cylinder 128 into position, as illustrated in FIG. 13, for receiving another button part. The needle 112 carrying a female button part remains in extended position as fixed by the cylinder 108. Upon completion of the foregoing operations the machine is loaded for inserting button parts into a workpiece to perform a quilting operation, as described below.

With the button holders ready, as stated above, the cycle of operation commences, as by an operator stepping on a switch. The first event in the cycle of operation is the actuation of the lower pneumatic cylinder 116 of holder 34 to move the slide frame 106 upwardly at the same time that the upper cylinder 54 of the male holder is actuated to drive the upper track frame downwardly. As the track frame 53 starts down the deflector 71 closes. This then presses the upper and lower deflectors 71 and 113 against the top and bottom surfaces of the workpiece 42 while driving the needle 112 and the female button piece 44 carried thereby through the compressed workpiece between the deflectors. This position of the machine is illustrated in detail in FIG. 18 and further described below. There then occurs a simultaneous operation of the upper piston 108 of the female holder to retract the needle of the female button part and operation of the lower piston 59 of the male holder to move the piston rod 61 thereof downwardly and thus drive the male button portion into the female button portion into the position illustrated in detail in FIG. 19. The quilting button is then completed in place through the workpiece and the piston 59 of the upper holder is retracted to remove the jaws from the flange of the male button part and the male track frame 53 and female slide frame 106 are retracted by operating the cylinder 54 of the upper holder to draw the track frame thereof upwardly in the tracks and the piston 109 of the cylinder 107 is operated to draw the female slide frame 103 downwardly into the position illustrated in FIG. 18. The male and female button holders are then reloaded as described above to complete a cycle of operation so that the machine is ready for the next button insertion.

Reference is now made to FIGS. 17 to 19 illustrating in some detail the engagement of the elements of the present invention with button portions and relationships of the elements during machine operation. In FIG. 17 the lower portion of the male button holder 33 is partially illustrated in position prior to pickup of the male button part 43. It will be seen that, with the head 62 retracted, the support arms 72 of the deflector 71 are engaged by the side bars 77 and 78 to pivot the deflector into open position. Operation of the upper and lower pistons of the pneumatic cylinder 56 moves the jaws 66 downwardly a distance equal to the total displacement of both of these pistons to spring these jaws 66 over the top flange of a male button part 43 disposed in a pickup disc 88. The jaws are able to enter the recess 96, as illustrated by the dashed position of the jaws in FIG. 17. Return of the upper and lower pistons 57 and 59 of the double piston cylinder 56 retracts the jaws 66 into the position of FIG. 14 but with the jaws then containing the gripping a male button piece 43.

Considering now the details of the button insertion in the quilt or the like 42, reference is made to FIG. 18 wherein there is illustrated the male track frame as having been lowered so that the deflector 71 pivots together into closed position as illustrated and presses downwardly into the upper surface of the work piece.

At the same time the slide frame 106 of the female button holder is moved upwardly to drive the needle 112 through the work piece while the lower deflector 113 depresses the other surface of the work piece. The female button portion 44 is thus moved upwardly to dispose the top thereof within the opening 73 in the upper deflector 71, again as illustrated in FIG. 18. This places the point of the needle 112 nearly in contact with the lower end of the shank of the male button portion 43. There then follows a simultaneous movement of the piston rod 61 downwardly to drive the male button portion into the female button portion and retraction of the needle 112 by withdrawal of the piston rod 111 of the pneumatic cylinder 108. It will be seen that, as the piston rod 111 is withdrawn or lowered, the flange portion of the female button portion 44 engages the end of the needle guide 115 to prevent the female button portion from moving further downwardly and thus the female button portion is maintained in position as the male button portion is driven into the central aperture of the female button portion, as illustrated in FIG. 19. Movement of the piston rod 61 accomplishes this final locking together of the quilting button portions and, as noted above, this is accomplished by appropriately operating the lower piston 59 of the double piston cylinder 56 of the male holder. Following insertion of the male button portion into the female button portion, as illustrated in FIG. 19, the lower piston 59 is first retracted to withdraw the jaws from the upper flange about the male button portion. At this time the entire quilting button is prevented from moving upwardly by engagement with the deflector 71. The entire track frame of the upper male holder is then retracted by operating the upper pneumatic cylinder 54 and the slide track 106 of the female holder is retracted by operating the lower pneumatic cylinder 116. The apparatus is then in condition for another button portion pickup and insertion and joiner as a repetition of the steps described above.

Figure 22:
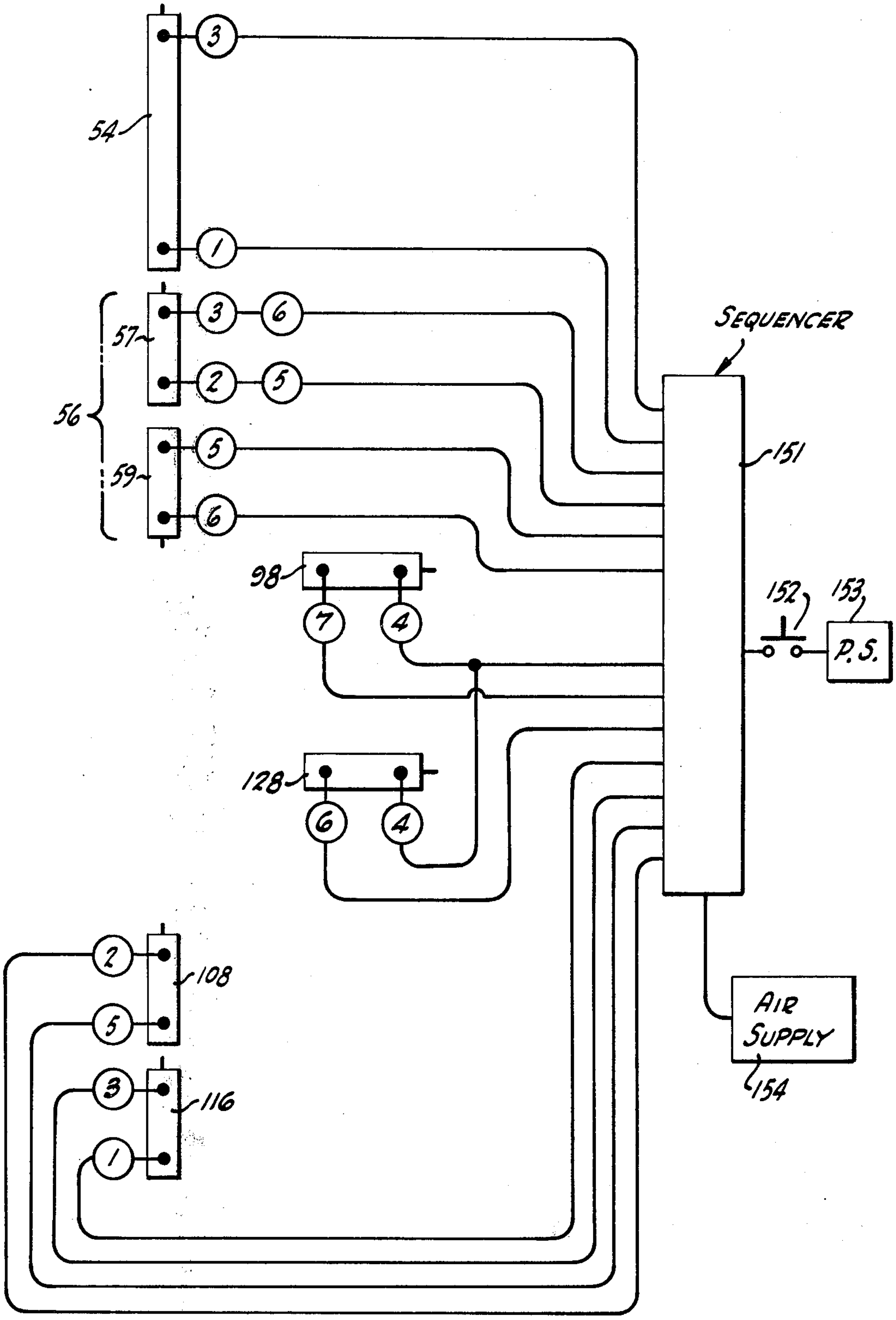
FIG. 22 is a schematic illustration of control means for the quilting machine of the present invention.

As noted above, the quilting machine of the present invention is adapted for automatic or semi-automatic operation and a preferred embodiment thereof incorporates an actuating switch such as, for example, a foot pedal which an operator depresses to initiate a cycle of button part insertion and pickup. This is then followed by manual or automatic movement of the work piece to the next desired location for quilting button insertion and actuation of the machine to complete another cycle of quilting button insertion and pickup. The foregoing is schematically illustrated in FIG. 22 wherein the separate cylinders of the male button holder and female button holder are illustrated and numbered the same as above and there is schematically shown a sequencer 151 actuated by a switch 152 from a power supply 153. An air supply 154 which may, for example, comprise an air compressor and accumulator, is sequentially connected by the sequencer 151 to appropriate pneumatic cylinders of the quilting machine. Each of the pneumatic cylinders and cylinder portions is provided with air ports at each end thereof and these are shown to be connected to the sequencer 151 which includes valving means for connecting either air pressure or exhaust to any of the cylinder ports. The valving means of the sequencer may, for example, be operated by cams carried on a shaft and rotated in response to closure of the switch 152. Preferably the sequencer is arranged to carry out a complete cycle of operation so that closing of the switch 152 will initiate the sequence or cycle which then continues to completion, even though the switch 152 is released, and the next cycle of operation is initiated by a second closure of the switch 152. Conventional air valves may be employed in the sequencer and likewise conventional cams may be mounted on a shaft for actuating these valves in desired sequence.

In FIG. 22 there is illustrated the sequence of operation of the male and female button holder of the present invention by the small encircled numbers in the air lines to the cylinders of the invention. It is first noted that a cycle of operation commences with the male and female button holders each containing an appropriate button part. Actuation of the switch 152 initiates operation of the sequencer 151 to apply air as indicated by numeral 1 to the lower portion of the cylinder 54 to drive the male track frame downwardly. This is followed by application of air beneath the piston of the upper portion 57 of cylinder 56 so that this latter cylinder is moved downwardly. At the same time that the male track frame is moved downwardly the female button holder slide frame is moved upwardly by application of air above the piston of the lower cylinder 116 as indicated by the numeral 1 in the lower portion of FIG. 22. Also at the same time that the male jaws are moved downwardly to force the male button portion through the female button portion, the needle 112 is retracted by application of air above the piston in the upper cylinder 108, as indicated by the numeral 2.

Following button insertion, the sequencer then applies air to the upper portions of cylinder 54 and cylinder portion 57 of cylinder 56, as indicated by the numeral 3 in the lines thereto, to retract or raise the jaws 66 and this is followed by reloading of the male button holder. Numerals 4 indicate application of air to the cylinder 98 to thus move the slide bar of the male button holder feed means into alignment with the male button holder to place a male button part in position to be gripped by the jaws of the male button holder. The sequencer then applies air pressure, as inciated by the numerals 5, to cylinder 56 to move piston rod 61 downwardly so that the jaws 66 grip the male button portion. The male button holder is then retracted by application of air to cylinder 56, as indicated by numeral 6, and this is followed by retracting the slide bar of the male feed means away from the male button holder and back into position to receive a male button part, as indicated by the small numeral 7.

The female button holder has the slide frame thereof retracted following button insertion by application of air, as indicated by the numeral 3, to the upper end of the cylinder 116. Reloading of the female button holder is accomplished by application of air, as indicated by the numeral 4, to the cylinder 128 to move the lower slide bar 121 into alignment with the axis of the female button holder and then application of air, as indicated by numeral 5, to the lower portion of the cylinder 108. This causes the needle 112 to be moved upwardly and driven through a female button part held in the feed means. The lower slide bar 121 is then retracted by application of air, as indicated by numeral 6, to cylinder 128. This then completes a cylce of operation which is repeated by the next closure of switch 152.

It will be seen that the quilting machine described above provides for either automatic or semi-automatic insertion of a two-part quilting button in a workpiece and locking together of the button parts. The quilting machine of the present invention operates very rapidly so as to carry out quilting operations on a commercial scale thereby facilitating the production of quilted items with a minimum of cost and effort. It is also noted that the mounting of two or more driving assemblies in the proper position(s) to operate simultaneously materially speeds completion of the quilting process.

Although the present invention has been described above with respect to a single preferred embodiment, it is not intended to limit the invention to the precise details of illustration or terms of description, for it will be apparent to those skilled in the art that various modifications and alternations may be made within the spirit of the present invention.

What is claimed is:

1. A quilting machine for inserting a two-part quilting button having a male and female part in a workpiece comprising a multiple displacement male button holder adapted to grip a male button part, a male button part feed mechanism including a slide bar movable into and out of alignment with said male button holder for gripping of a male button part from the feed mechanism by vertical displacement of a portion of said male button holder, a multiple displacement female button holder disposed in axially aligned relation to said male button holder and having a needle extending axially therefrom, a female button part feed mechanism including a lower slide bar movable into and out of alignment with said needle and retaining a female button part thereon upon displacement of the female button holder to drive the needle through a female button part, a workpiece holder disposed between said holders, means displacing said male and female button holders axially toward each other to pierce a workpiece disposed therebetween by said needle and female button part followed by insertion of said male button part in said female button part as said needle is retracted.

2. The machine of claim 1 further defined by said female button holder including a deflector through which said needle is adapted to move, gripping means on said male button holder for movement axially thereof to pick up a male button part and retract such part prior to button part insertion, and said male button holder including a deflector having an opening therethrough for movable insertion of said needle and being separable for movement of said gripping means therethrough to grip a male button part whereby said deflectors compress a work piece for button part insertion.

3. The machine of claim 1 further defined by said male button holder including a track having a track frame slidably retained therein, a first cylinder mounted on said track frame and having a piston rod extending axially thereof into connection with said track for displacing the track frame along the track, and a second centrally divided cylinder disposed in said track frame with a first piston rod extending axially from a first end thereof into connection with the track frame for moving the second cylinder relative to the track frame and a second piston rod extending axially from the other end of said second cylinder for moving male button part gripping means connected to the outer end thereof.

4. The machine of claim 3 further defined by a split conical deflector disposed at the end of said track frame adjacent the female button holder with each deflector part pivotally mounted on the track frame, resilient means urging the deflector parts together, and side bars extending from said track for engaging said deflector parts with the track frame located inwardly of the track for pivoting said deflector parts apart whereby gripping means of said male button holder are movable through the deflector to grip a male button part.

5. The machine of claim 1 further defined by said male button part feed mechanism comprising a part dispenser feeding male button parts onto an inclined slotted track extending downwardly to a first side of said slide bar in line with a feed point thereof whereby male button parts slide down said track with a shank of each part depending through the track, said slide bar having a lateral slot extending therethrough from a slide bar edge to said feed point whereby button parts successively move onto said slide bar to said feed point with the button part shank extending through said slide bar, and a drive cylinder engaging said slide bar for moving same laterally of said male button holder between an extended position aligning said feed point with the axis of said male button holder and a retracted position aligning said lateral slot with the slot in said track.

6. The machine of claim 5 further defined by said lateral slot in said slide bar having a length substantially equal to the diameter of a flanged head of a male button part and said slide bar having an annular depression in the upper surface about said feed point with the inner radius of the depression slightly less than the diameter of the flanged head of a male button part, and said male button holder having spring loaded jaws adapted to fit over the flanged head of a male button part in extended position of said slide bar by lowering said jaws to grip the part for removal from the slide bar by raising the jaws.

7. The machine of claim 1 further defined by said female button feed mechanism comprising a female button part dispenser feeding female button parts successively onto a downwardly inclined track extending to a first side of said lower slide bar, said lower slide bar having a slot thereon extending from a leading edge thereof to a feed point and having a shoulder overlaying an area partially about said feed point whereby a female button part having a flanged head and fed onto the lower slide bar from said track moves onto said feed point with a portion of the flanged head beneath said shoulder to hold the button part against vertical displacement, and a drive cylinder engaging said lower slide bar and controllably moving the lower slide bar back and forth between a retracted position with the feed point aligned with said inclined track and an extended position with the feed point aligned with the needle of said female button holder whereby upward movement of said needle with the slide bar in extended position drives said needle through the button part and retraction of the slide bar leaves the female button part impaled upon the needle for subsequent insertion in a workpiece.

8. The machine of claim 7 further defined by said lower slide bar having a side wall inset from said first side thereof to define a ledge along said first slide over which sides of the female button track extends and said side wall being laterally offset from said feed point a distance substantially equal to the diameter of the flanged head of a female button part.

* * * * *